(12) United States Patent
Sumi et al.

(10) Patent No.: US 7,064,776 B2
(45) Date of Patent: Jun. 20, 2006

(54) OBJECT TRACKING APPARATUS, OBJECT TRACKING METHOD AND RECORDING MEDIUM

(75) Inventors: Yasushi Sumi, Tsukuba (JP); Fumiaki Tomita, Tsukuba (JP); Yutaka Ishiyama, Tokyo (JP); Fumio Kubo, Yokohama (JP)

(73) Assignees: National Institute of Advanced Industrial Science and Technology, Tokyo (JP); Stanley Electric Co., Ltd., Tokyo (JP)

( * ) Notice: Subject to any disclaimer, the term of this patent is extended or adjusted under 35 U.S.C. 154(b) by 629 days.

(21) Appl. No.: 10/078,882

(22) Filed: Feb. 19, 2002

(65) Prior Publication Data

US 2002/0167594 A1 Nov. 14, 2002

(30) Foreign Application Priority Data

May 9, 2001 (JP) .............................. 2001-138546

(51) Int. Cl.
*H04N 5/232* (2006.01)
(52) U.S. Cl. .................................. 348/169; 348/208.14
(58) Field of Classification Search ................ 348/169, 348/170, 171, 172, 143, 152, 208.14; 382/103, 382/165
See application file for complete search history.

(56) References Cited

U.S. PATENT DOCUMENTS

| 5,764,283 A * | 6/1998 | Pingali et al. ............... 348/169 |
| 5,867,584 A * | 2/1999 | Hu et al. ..................... 382/103 |
| 5,912,980 A * | 6/1999 | Hunke ......................... 382/103 |
| 5,982,420 A * | 11/1999 | Ratz ............................ 348/171 |
| 6,130,964 A * | 10/2000 | Marques et al. ............ 382/236 |
| 6,437,819 B1 * | 8/2002 | Loveland ..................... 348/143 |
| 6,445,409 B1 * | 9/2002 | Ito et al. ...................... 348/155 |
| 6,608,296 B1 * | 8/2003 | Toyoda et al. ........... 250/208.1 |
| 6,658,136 B1 * | 12/2003 | Brumitt ....................... 382/103 |

(Continued)

OTHER PUBLICATIONS

M. Tonko, H—H. Nagel, "Model-based Stereo-Tracking of Non-Polyhedral Objects for Automatic Disassembly Experiments", *International Journal of Computer Vison 37(1)*, 99-118, 2000.

(Continued)

*Primary Examiner*—Gims Philippe
*Assistant Examiner*—Erick Rekstad
(74) *Attorney, Agent, or Firm*—Carella, Byrne et al.; Elliot M. Olstein; William Squire (57) ABSTRACT

An object movement tracking apparatus and its method tracks an object with an unknown initial position and which object is continually moving, the apparatus for recovering a tracking process even when the tracking has failed and includes an observing device such as a video camera for observing a scene at a video frame rate. Time-sequentially acquired image data from the observing device are stored in an image memory device and the data processed in parallel. During data processing, an object recognition module selects a frame memory based on predetermined information. An estimated value of position/posture of the object are calculated from the image data and transmitted. A movement tracking module receives transmitted data from the object recognition module, replacing a current frame with a next frame and waits until image data in the next frame are inputted. When image data inputting is finished, the up dated replacement in position/posture of the object and its evaluated value are calculated by comparing image data and the object model. The system mode is changed and updated based on the obtained evaluated value.

8 Claims, 5 Drawing Sheets

U.S. PATENT DOCUMENTS 6,678,394 B1 * 1/2004 Nichani .................. 382/103
6,690,374 B1 * 2/2004 Park et al. ................ 345/427

OTHER PUBLICATIONS

D.G. Lowe, "Robust Model-based Motion Tracking Through the Integration of Search adn Estimation", *International Journal of Computer Vision 8:2*, 113-122, 1992.

H. Kolling, H—H Nagel, "3D Pose Estimation by Fitting Image Gradients Directly to Polyhedral Models", *IEEE*, 569-574, 1995.

D. B. Gennery, "Visual Tracking of Known Three-Dimensional Objects", *International Journal of Computer Vision 7:3*, 243-270, 1992.

* cited by examiner

(a) Tracking result without occulusion (b) Tracking result with occulusion

FIG. 8

OBJECT TRACKING APPARATUS, OBJECT TRACKING METHOD AND RECORDING MEDIUM

BACKGROUND OF THE INVENTION

1. Field of the Invention

The present invention relates to an object tracking apparatus, an object tracking method and a recording medium for tracking movements of an object by detecting the object on real-time basis based on inputted images, which are acquired time-sequentially and successively, without inputting information on the initial position of the object.

2. Brief Description of the Related Art

Tracking a moving object is a method to detect a displacement in position/posture of the object between two neighboring frames of time-sequential image data. Basically a real-time object tracking can be realized when the displacement between two neighboring frames is calculated at a rate faster than the video rate (30 frames per second). However, almost all proposed methods in the past did not consider how to acquire the initial position of the object, which plays a role of a starting point of the tracking. Consequently, these methods are used only when the initial position of the object is already known.

In the case of tracking the object of which initial position is unknown, a method where a three-dimensional object recognition method, as a pretreatment, is combined with the object tracking method is proposed. However, since the three-dimensional object recognition method has to detect position/posture of the object from the whole scene where a huge amount of calculations in order of $O(MN)$ to $O(M^3N^3)$, (M and N are respectively numbers of features of a scene and a model) are required, tracking the object at the video rate is difficult. Here the function $O(f(n))$ is a function to express asymptotic time complexity, when the n number of data are inputted. In other words, even a tracking system combined with the object recognition method, cannot deal with a continually moving object (a non-stop moving object).

It is inevitable that the object is sometimes lost during tracking the object due to occlusion phenomena or the like in the movement tracking process. In conventional methods, however, it is difficult to resume the tracking process once the object is lost.

Practically used movement tracking systems are based on very simple algorithms such as background differential methods or the like. Since these methods can process data at very fast rate, it is not required to detect the initial position of the object, but functions attained by these methods are limited. For example, it is difficult for these methods to estimate 6 degrees of freedom, i.e. position/posture of the object in a three-dimensional space.

As mentioned above, since conventional object movement tracking methods require information on the initial position of the object to be tracked, an object of which initial position is unknown or a continually moving object cannot be tracked. In addition tracking process cannot be recovered once the tracking is failed on the way. As measures against the problems mentioned above, although a lot of movement tracking methods have been proposed, they are applicable only to limited fields except simple algorithms such as background differential methods.

SUMMARY OF THE INVENTION

The present invention is carried out in view of the above-mentioned problems. And its objective is to provide an object tracking apparatus, an object tracking method and a recording medium in the tracking system capable of dealing with the object of which initial position is unknown or the continually moving object and capable of recovering the tracking process even when the tracking is failed during tracking process.

The present invention comprises the object tracking apparatus, the object tracking method and the recording medium stored a program for the tracking, capable of detecting position/posture of the object of which initial position is unknown, from time-sequentially acquired images.

The object movement tracking apparatus according to the present invention for detecting movements of the object from time-sequentially inputted images on real time basis comprises: an observing device for observing a scene including the object and for acquiring inputted image data at a rate more than the predetermined rate; an image memory device for temporally storing sequentially inputted image data from the observing device; and a computer for processing the sequentially inputted image data so as to track the movement of the object.

An object movement tracking method according to the present invention executed by tracking device, where: the tracking method based on image data sequentially inputted from the observing device and temporally stored in the image memory device, comprises steps of: acquiring an initial position of the object to be tracked; detecting a movement of the object; tracking the movement of the object on real time basis based on image data sequentially inputted and temporally stored in the image memory device; and recovering and resuming the tracking step, when tracking the movement of the object is failed during the tracking.

In order to execute the above-mentioned object movement tracking method, the following modules are installed in the computer: an object recognition module for selecting a frame among image data stored in the image memory device frame by frame, and for detecting position/posture of the object in the selected frame; and a movement tracking module for tracking the positions/postures of the object in succeeding frames to the selected frame by the object recognition module starting from the position/posture of the object in the selected frame; where: the object recognition module and the movement tracking module are run in parallel as communicating each other.

A recording medium according to the present invention arranged in the object movement tracking apparatus stores the following information and programs: information on the initial position of the object to be tracked; an object movement tracking program for detecting and tracking on real time basis based on image data inputted from the observing device and stored in the image memory device; and a program for recovering and resuming tracking step when the tracking program fails in tracking the movement of the object during tracking step.

The following programs are stored in the above-mentioned recording medium: a program for the object recognition module for selecting a frame among imaged data stored in the image frame memory frame by frame, and for detecting position/posture of the object in the selected frame; a program for the movement tracking module for tracking position/posture of the object in succeeding frames to the selected frame starting from position/posture of the object in the selected frame; and a program for running the object recognition module and the movement tracking module in parallel as the modules are communicating each other.

DETAILED DESCRIPTION OF THE PREFERRED EMBODIMENTS

Figure 1:
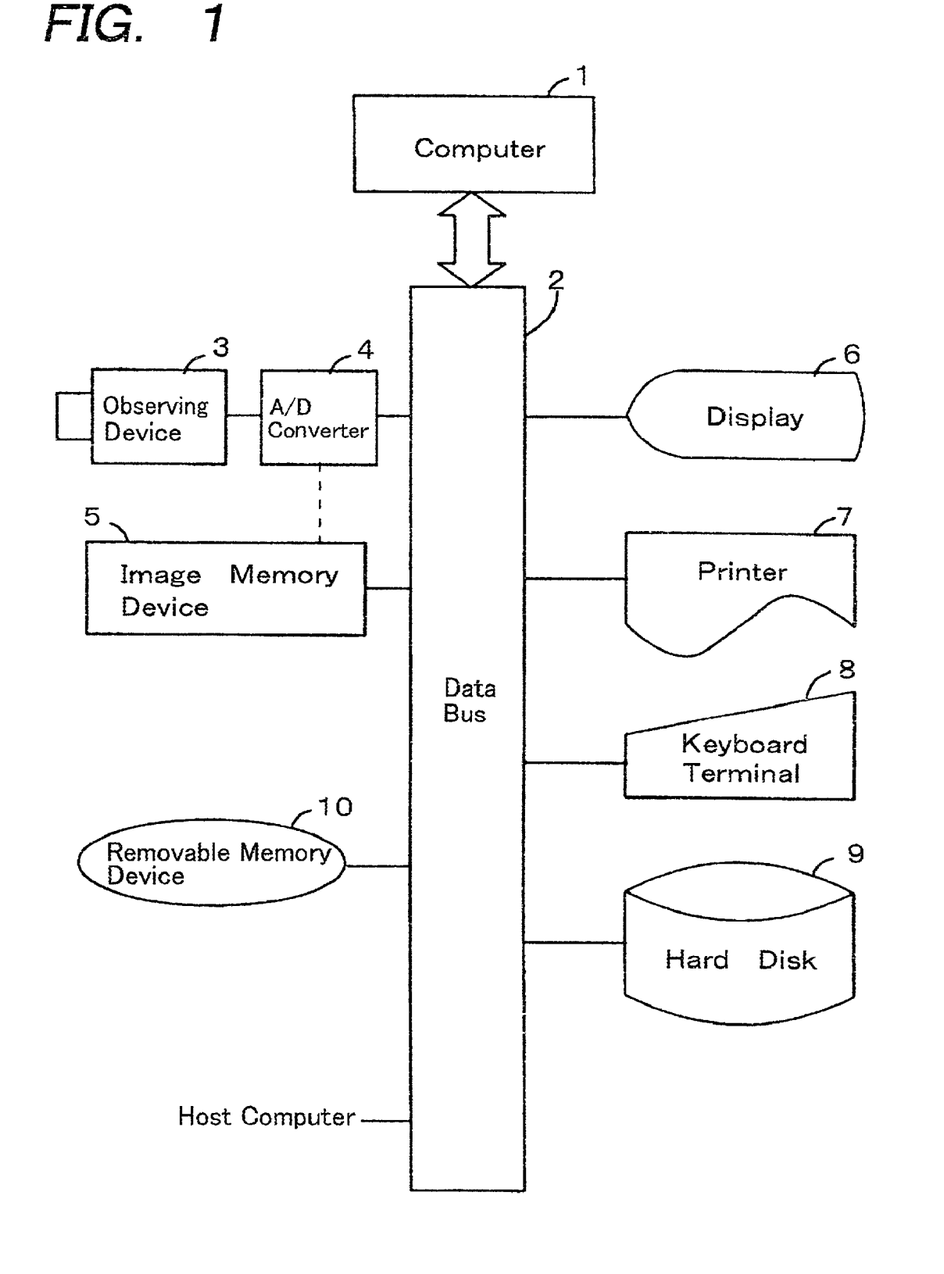
FIG. 1 is a block diagram illustrating a system configuration for embodying the present invention.

FIG. 1 is the block diagram illustrating the system configuration for realizing the object movement tracking device and method according to the present invention.

In the figure, a reference numeral "1" is a computer for controlling the whole system and processing the object movement tracking, connected to other portions, which will be explained below, via data bus 2.

A reference numeral "3" is an observing device comprising a camera equipped with an image sensor (here it is a CCD camera), from which analogue data are outputted to an A/D converter 4 and converted into digital data. A reference numeral "5" is an image memory device for temporally storing a huge amount of image data (some hundreds frames of images), to which converted digital data by the A/D converter 4 are inputted via the data bus 2 or directly.

Reference numerals "6", "7" and "8" are respectively a display for displaying images, a printer for outputting printed images and a keyboard terminal. A reference numeral "9" is a hard disk drive for storing a system software as an object movement tracking program of the present system and an object model describing information on a shape and characteristics of the object to be tracked. A reference numeral "10" is a removable memory device for reading a removable recording medium in which the object movement tracking program of the present system is recorded, from which the system software is installed into the hard disk drive 9.

The above-explained system is connected to an outside host computer or the like via the data bus 2.

Figure 3:
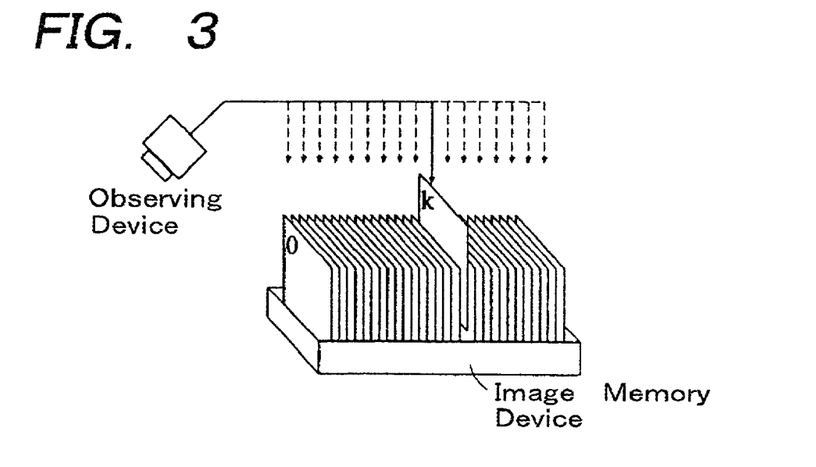
FIG. 3 is a schematic diagram illustrating a configuration of the object movement tracking apparatus.

FIG. 3 is the schematic diagram illustrating the configuration of the object movement tracking device equipped with the observing device 3 and the image memory device 5. The image memory device 5 has several hundreds megabyte of a total memory capacity comprising a mass storage frame memory capable of storing several hundreds frames of image data, where inputted image data are consecutively stored from the forefront. When a capacity of inputted image data exceeds the total capacity of the frame memory, image data are overwritten from the forefront. Thus, overwriting procedures are repeated.

Image data stored on respective frames in the image memory device 5 correspond to single image data when one CCD camera is used as the observing device 3. When a stereo camera comprising a plurality of CCD cameras is used as the observing device, image data correspond to a set of image data. When a fast laser range finder is used as the observing device 3, image data correspond to range image data.

An object recognition module and a moving object tracking module, which are programs installed in the computer 1 via the removable memory device 10, access time-sequential image data stored in the above-mentioned frame memory in parallel. When the frame number corresponds to N, the above-mentioned respective vision modules can access N−1 frames comprising sets of past time sequential stereo image except a frame currently inputted.

Figure 2:
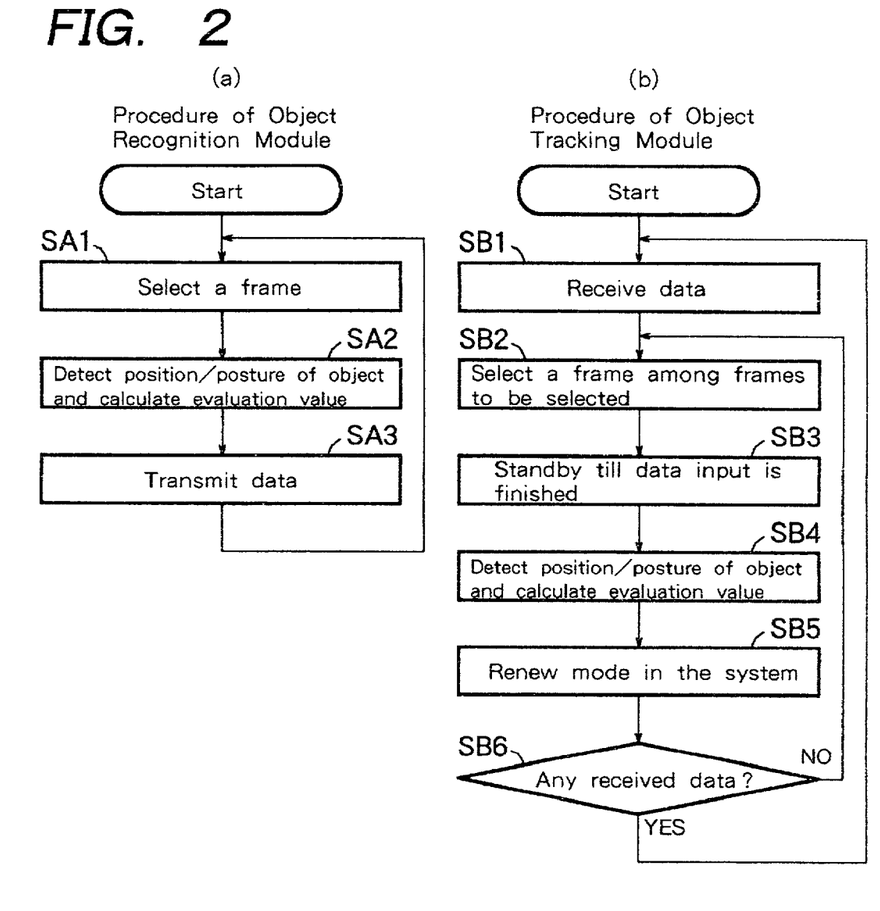
FIG. 2 is flow charts illustrating a basic procedure of the present invention.

The basic procedure of the present invention is explained according to the flow charts in FIG. 2.

The flow chart (a) in FIG. 2 shows a processing flow of the object recognition module in the object movement method.

At first a frame is selected based on a system mode, which will be explained below, or based on information transmitted from the movement tracking module (SA1) and position/posture of the object and its evaluated value are calculated by comparing image date on the selected frame with the object model (SA2). The frame number selected by the movement tracking module, position/posture of the object and the evaluated value are transmitted to the movement tracking module. Processing steps SA1 to SA3 are repeated.

More specifically, candidates on position/posture of the object are selected by comparing extracted features of the image data of the selected frame with features of the object model and selected respective candidates are compared with the image data so that an optimum solution is selected among the candidates and position/posture of the optimal solution are slightly adjusted. Then the frame number, the adjusted optimal solution and an evaluated value of the optimal solution are transmitted to the movement tracking module.

Since methods comparing image data with object model and detecting position/posture are out of the scope of the present invention, further explanations are omitted.

The flow chart (b) in FIG. 2 shows a processing flow of the object recognition module in the object movement method.

At first a frame is selected based on the system mode, which will be explained below, or information transmitted from the movement tracking module (SB1), the current frame used as the frame to be tracked is updated (SB2) and the process step stays at a standby status until inputting image data of the current frame is finished (SB3). When inputting image data is finished, a displacement of position/posture of the object and its evaluated value are calculated by comparing image data with the object model (SB4) and the system mode is updated based on the calculated evaluation value (SB5). Whenever information is transmitted from the object recognition module the processing steps from SB1 are repeated. When information is not transmitted from the object recognition module, the next frame is updated as a current frame (When the current frame happens to be the last frame, it is updated to the forefront frame.) and processing steps from SB2 are repeated.

Since methods comparing image data with object model and calculating the displacement of the object are out of the scope of the present invention, further explanations are omitted.

In the present invention, moving human bodies or cars may be used as objects to be tracked.

Hereinafter the above-described tracking processing steps are explained in detail by referring to FIG. 4 to FIG. 8.

Figure 4:
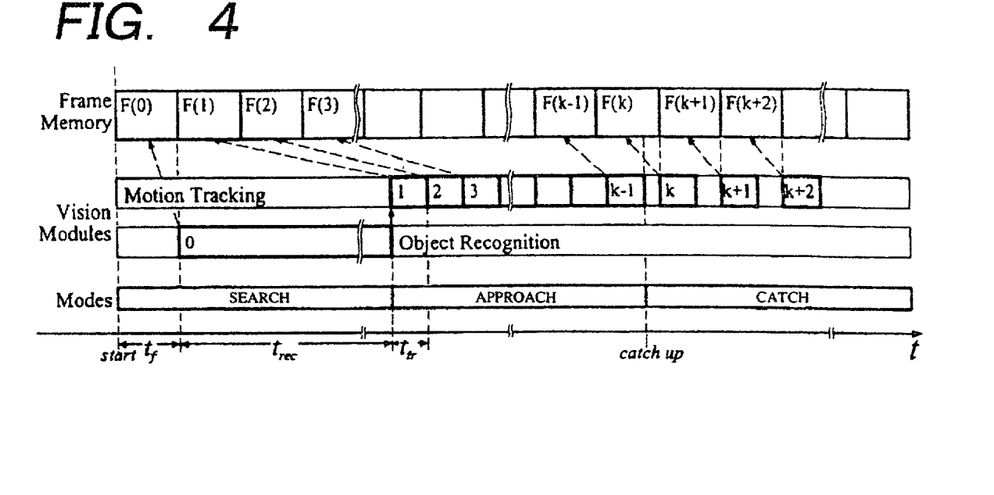
FIG. 4 is a time chart illustrating basic procedures of the present invention.

FIG. 4 is the time chart illustrating basic procedures of the present invention. In the figure a lowermost horizontal axis is an elapsed time scale, an uppermost portion depicts frames stored image data in the frame memory, an intermediate portion depicts processing statuses of the object recognition module and movement tracking module and lower portion depicts mode statuses in the system.

As shown in FIG. 4, image data are inputted in $0^{th}$ frame F(0) of the frame memory when the inputting image data is started at a time $t_{start}$. However, at this stage respective modules are in standby statuses and cannot start processing operations. In the figure the standby statuses are represented by boxes trimmed with thin solid lines.

When storing image data in frame F(0) is finished during a time span $t_f$, the object recognition module starts processing the frame F(0). Here $t_f$ represents a frame cycle (usually $t_f=1/30$) and activated modules are represented by boxes trimmed with thick solid lines. Arrows accompanied with broken lines represent accesses from respective modules to the frame memory and numerals in thick lined boxes represent frame numbers being processed.

The object recognition processing is a method for detecting position/posture of the object from the whole scene. As mentioned above, since the amount to be calculated is generally is in orders of O(MN) to $O(M^3N^3)$, (M and N are respectively numbers of features of the scene and the model), the processing operation at the video rate is difficult to continue.

When $t_{rec}$ is defined as a time required to recognize the object, the system does not have any information on position/posture of the object during a time span between $t_{start}$ to $t_f+t_{rec}$. Here the status is defined as "SEARCH Mode".

The upper limit of required processing time for recognizing the object is determined by the capacity of the frame memory. When the number of frames capable of being stored in the frame memory is defined "N", image data in the frame F(1) is overwritten by image data in the frame F(N+1) at a time $Nt_f$ after the object recognition is started. Consequently, even if the object recognition against the frame F(0) is properly completed at the time $Nt_f$, the object tracking procedure is failed. Therefore the time for processing the object recognition should be satisfied the following equation.

$$t_{rec} \leq Nt_f \quad (1)$$

The movement tracking module starts processing at a time $t_f+t_{rec}$ as shown in FIG. 4 after receiving the processed result by the object recognition module. An arrow accompanied by a solid line in the figure represent data transfer/receipt between modules. The movement tracking module sequentially calculates position/posture, T(i)(i=1, 2, - - - ) of the object on a frame F(i), based on the calculated T(0) on the frame F(0). Here T(i) is a transformation matrix expressing position/posture of the object on the frame F(i).

Position/posture of the object tracked by the system at the starting time of the movement tracking is based on image data $t_f+t_{rec}$ seconds before the current time. A status, where past position/posture of the object is tracked, is defined as "APPROACH mode".

In the APPROACH mode a frame number $n_{in}$ to which image data are inputted and a frame number $n_{tr}$, to be processed by the movement tracking module at a time "t" are respectively defined as follows.

$$n_{in}=t/t_f, \; n_{tr}=(t-(t_f+t_{rec}))/t_{tr} \quad (2)$$

wherein: decimal parts at right side of equations are rounded up and "$t_{tr}$" is defined as a mean processing time per frame.

Relations between $n_{tr}$ and $n_{in}$ in accordance with a time after the starting the object tracking are as follows. At $t_f+t_{rec}$, the starting time of the object tracking, it is sure that $n_{tr}<n_{in}$. If $$t_{tr}<t_f \quad (3)$$

$n_{tr}$ gradually approaches $n_{in}$ and at the time $$t_{catchup}=((t_f+t_{rec})/(t_f-t_{tr}))t_f \quad (4)$$

$n_{tr}=n_{in}$ (in FIG. 4 $n_{in}$=k). At this time since image data are inputted in the frame $F(n_{in})$, an access from the movement tracking module to this frame is locked. Consequently, the movement tracking module is in a "standby" status until inputting image data in the frame $F(n_{in})$ is finished. This status is designated as "CATCH mode". In the CATCH mode "a current position" of the object is tracked.

The mean processing time per frame $t_{tr}$ depends on a frame cycle $t_f$. In the present system, only when the condition defined by the equation (3) is satisfied, the tracking process is properly executed. If $t_{tr}=t_f$, the tracking process cannot catch up with the image data inputting step, which means the APPROACH mode perpetually continues. If $t_{tr}>t_f$, image data in the frame $F(n_{lap})$ are overwritten by image data in frame $F(N+n_{lap})n_{lap}t_{tr}$ seconds after the tracking is started, which means the tracking procedure is failed at this stage. Here a reference character $n_{lap}=Nt_f/(t_r-t_f)$.

In the movement tracking procedure, it is inevitable that the tracking procedure loses the object to be tracked. However, since the present invention does not require information on the initial position of the object, the tracking procedure can be recovered even when the procedure loses the object to be tracked.

Figure 5:
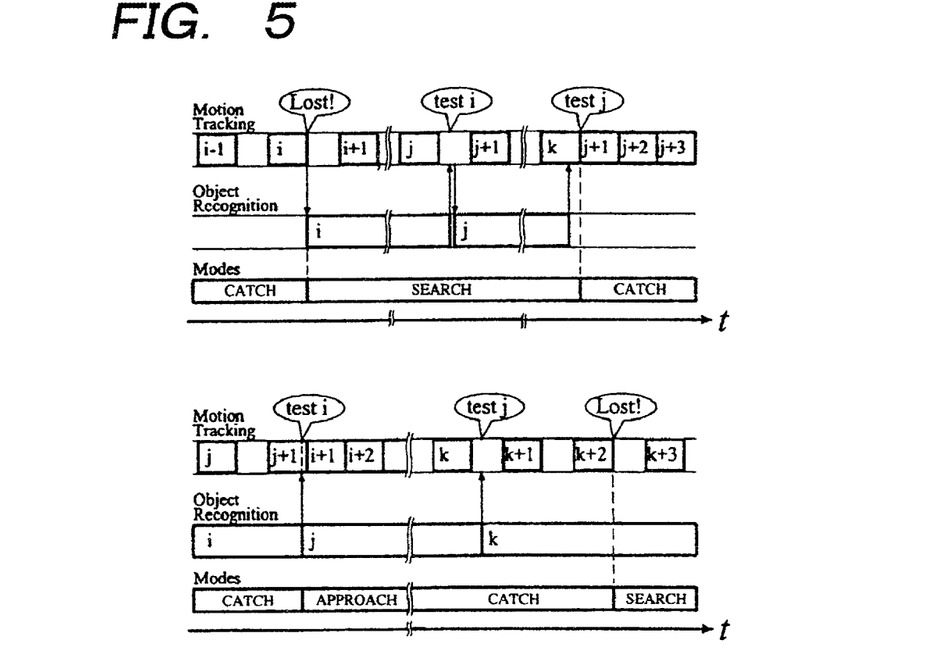
FIG. 5 is a diagram for explaining a recovery process from a failure during the tracking.

While the system is in the APPROACH mode or in the CATCH mode, and if an evaluated value $S_{tr}$ of the movement tracking result in a frame F(i) is lower than a threshold value $_s$, namely, $$S_{tr}<\theta_s \quad (5)$$

the object is considered to be lost and the system goes to "SEARCH mode" as shown in FIG. 5. FIG. 5 is the diagram for explaining a recovery process from a failure in tracking during the tracking procedure.

Two recovering methods from the SEARCH mode are possible. One method is to start the object recognition module after the system is in the SEARCH mode. As shown in (a) of FIG. 5, when the system goes to the SEARCH mode owing to a low evaluated value $S_{tr}(i)$ of the frame F(i), the object recognition module works on the frame F(i). After the recognition on the frame F(i) is finished, if a relation between an evaluated value $S_{rec}(i)$ of the recognition and $S_{tr}(i)$ satisfies the following equation $$S_{rec}(i)>\omega S_{tr}(i) \quad (6)$$

the system goes to the APPROACH mode. Here ω is a weight coefficient. If the relation between $S_{rec}(i)$ and $S_{tr}(i)$ does not satisfy the equation (6), the frame F(i) is considered to be unrecognizable and the recognition is executed on the most current frame F(j).

Other method is to activate the recognition module always regardless of any mode as shown in (b) of FIG. 5. Whenever the recognition process on a certain frame is finished, the relation between $S_{rec}(i)$ and $S_{tr}(i)$ is judged whether it satisfies equation (6) or not. If satisfies, the system goes to the APPROACH mode immediately. Though this method may require more calculating resources in the computer, it is highly possible to reduce a time for recovering. In addition, since in this method recognition processes for respective frames are independent each other, the time for recovering can be reduced further without decreasing a performance of the method, if a parallel processing can be executed by the computer having many processing units under a parallel processing environment.

Even when the system goes to the SEARCH mode, the movement tracking module does not stop the tracking procedure. Because the system does not always lose track of the object, but the evaluated value might be lowered temporally due to an influence of a partial occlusion when the system goes to the SEARCH mode. When the influence of the occlusion is reduced and if the evaluated value $S_{tr}(i)$ surpasses the threshold value, the system is recovered to the CATCH mode again.

Hereinafter experimental results of tracking a continually moving object and recovering from failures in tracking are explained. In the experiments a stereo camera equipped with three lenses is used as the observing device, and an object with known shape and size which moves against the observing device as a rigid body is used as the object to be tracked. Recovering experiments from failures in tracking are executed according to the way shown in (a) of FIG. 5.

Only a personal computer, an image inputting board and the stereo camera are requisite for a hardware configuration of the system. A CCD camera, a CMOS camera or the like can be used as a camera equipped with image sensor.

If additional frame memories are arranged on the image inputting board, RGB images can be successively stored up to a proper frame. Images acquired by three cameras are respectively inputted in RGB plains of respective frames.

System software comprises the following three software modules: vision modules for object recognition and for movement tracking and a controlling module for image inputting to the frame memories. The controlling module for image inputting monitors image data being inputted to the frame memories and ensures cyclic writing image data on the frame memories. Respective modules are written in C language. Parallel running these modules are realized by a parallel programming by the POSIX thread.

Figure 6:
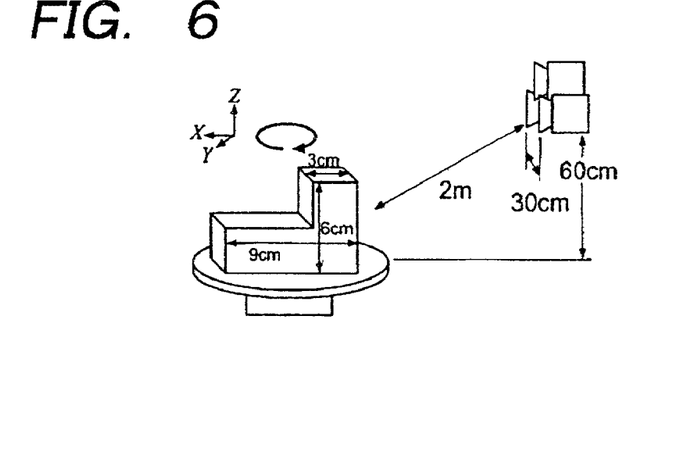
FIG. 6 is a diagram for explaining movement tracking experiments using a revolving table.

Movement tracking experiments employing the revolving table are executed by the arrangement shown in FIG. 6. In the figure respective distances between two cameras are set at ca. 30 cm, a distance from cameras to the object is set ca. 2 m and a surface of the revolving table is arranged parallel to the X-Y plane of the world coordinate. An L-shaped toy block is used as the object. The revolving table is rotated at a constant rate of ca. 18 degrees per second. Tracking processes are executed respectively in the following two experiments: the result of experiment (A) is shown in (a) of FIG. 7 with no occlusions and the result of experiment (B) is shown in (b) of FIG. 7 with periodic complete occlusions.

Figure 7:
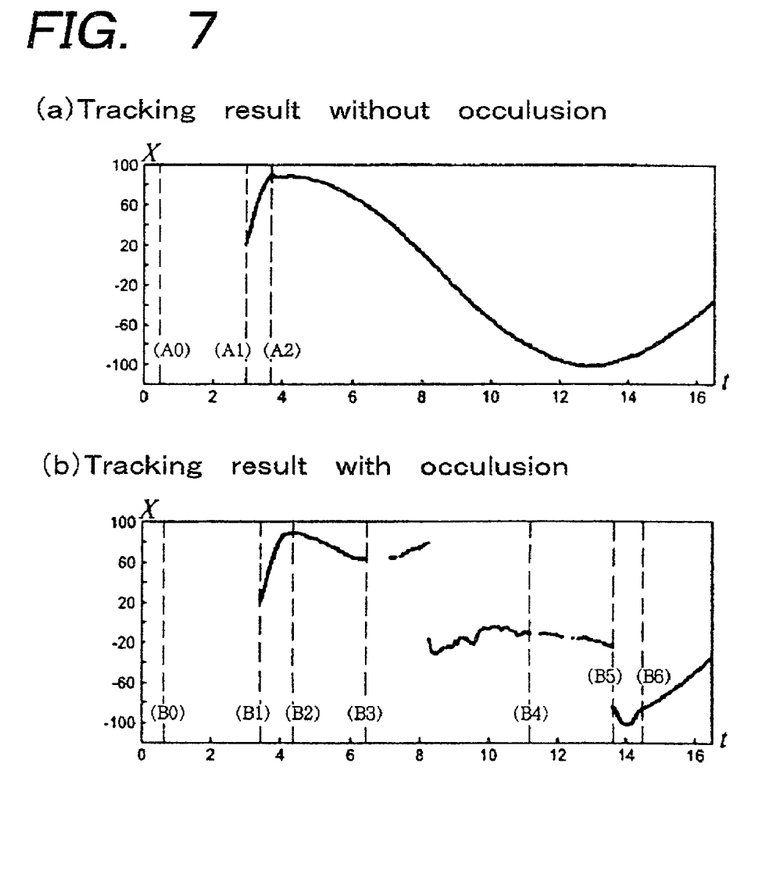
FIG. 7 is diagrams for explaining the movement tracking results according to the experiments.
Figure 8:
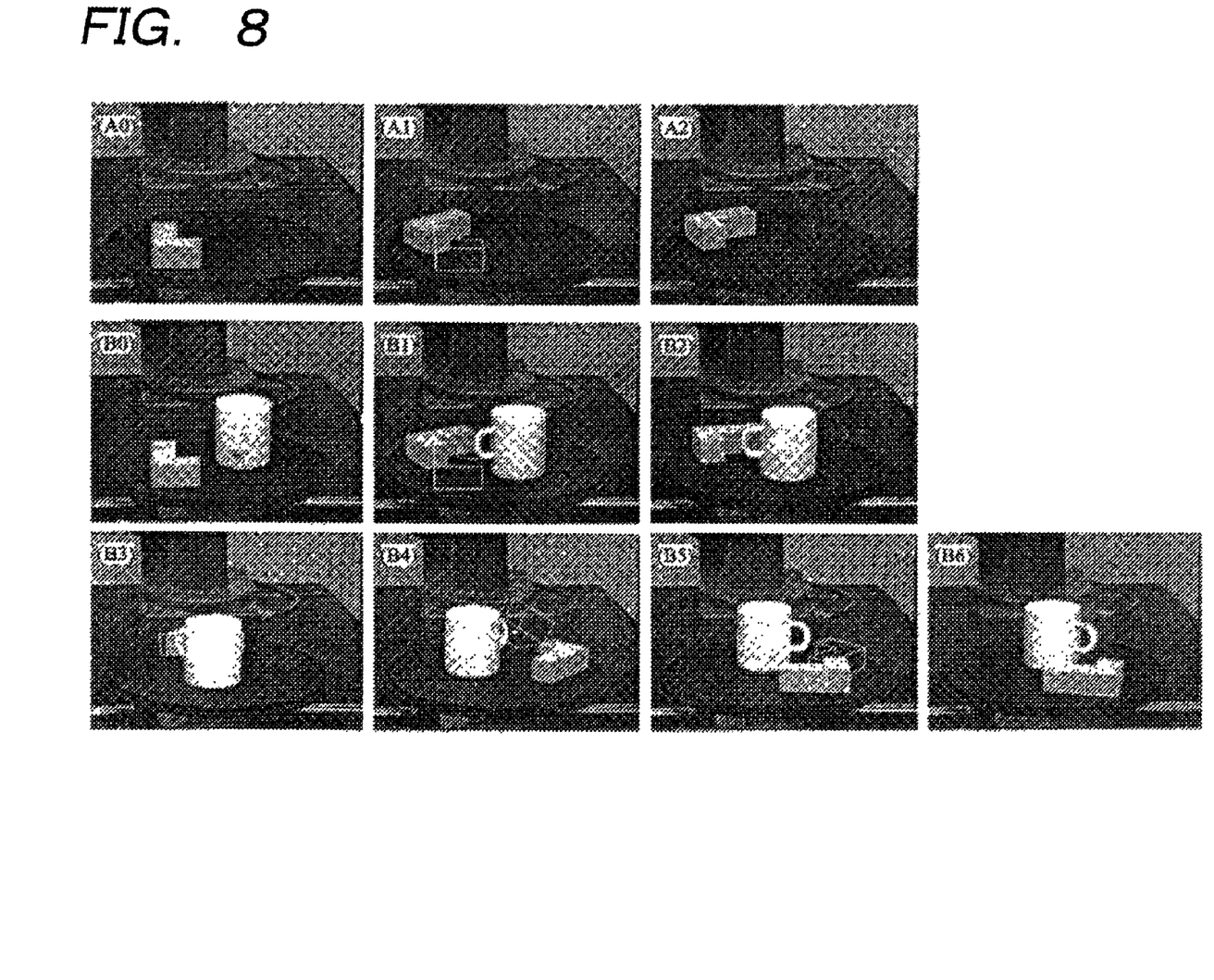
FIG. 8 shows images acquired during the movement tracking experiments.

In FIG. 7, each of (a) and (b) depicts a predetermined moving point on the object in the X coordinate, as a locus based on the displacement of position/posture of the object obtained from experiment (A) or (B). If the object is tracked properly on real-time basis, the locus should depict a sine curve with a ca. 20-second cycle. In FIG. 8, projected images of inputted stereo images on the left image plane at times designated by vertical broken lines in (a) and (b) of FIG. 7 are shown.

In FIG. 8, A0 corresponds to a time when inputting image is started in experiment (A). A1 corresponds to a time when the recognition of the object to frame F(0) is finished. In this experiment the time $t_{rec}$ required for the object recognition is ca. 2.3 seconds. The tracking module is activated after the time A1 and at a time A2 the tracking process catches up to the image inputting process (APPROACH mode). The inputted frame at the time A2 is frame F(99) and a time required from the time A1 to the time A2 is ca. 0.73, which means the average processing time per frame is ca. 7.4 milliseconds. After the time A2 the system goes to the CATCH mode and the real-time tracking is executed. A time span from t=0 to A0 is a time required for initializing the system.

In experiment (B), ca. 4 seconds out of ca. 20 seconds required for one rotation of the table, are allocated for the complete occlusion where the object is hardly observed so that the tracking is failed. The threshold value in equation (5) for the discriminating the failure of the tracking process is set s=0.5. Taking noises of the system into consideration, it is arranged that the system goes to the SEARCH mode, only when three consecutive evaluated values of the tracking results are lower than the threshold value.

As shown in FIG. 7, the locus in experiment (B) indicates almost the similar the locus in experiment (A) up to ca. 6 seconds after the processing is started. However at a time B3 the system is judged as the failure in tracking and goes to the SEARCH mode. The object recognition module immediately starts processing on frame F(177) and finished processing at a time B4, but the result of the recognition does not satisfy equation (6). Because almost all of the object is occluded at the time B3 as seen from FIG. 8. At a time B4, the recognition process is executed again on frame F(322) and the system goes to the APPROACH mode at a time B5, thus the system is recovered from the failure in tracking.

These results are obtained in experiments where the table rotates at a constant rate, but experiments where the object is moved by human hands are also executed and confirmed the present system can also applicable to any movements of the object. Since the movement tracking module of the present system is programmed based on an assumption that the displacement of the object is very little, the tracking is failed when the object is moved by human hands. However, the system can be recovered after passing the similar procedures to experiment (B).

As mentioned above, in order to operate the present method properly, equations (1) and (3) relating to the object recognition time $t_{rec}$ and the frame processing time $t_{tr}$ should be satisfied. When maximum frame number=873 and the frame cycle $t_f=1/30$ employed in the experiment are put into equations, the following results are obtained.

$$t_{rec} < 873 \times 1/30 = 29.1 \, t_{tr} < 1/30$$

Since $t_{rec} \approx 2.3 < 29.1$ and $t_{tr} \approx 0.0074 < 1/30 \approx 0.03$, obviously conditions of the experiments satisfy equation (1) and (3).

The program realizing the above-described object movement tracking method of the present invention can be stored in the removable memory device 10 and it can be run by computers when it is installed in computers via the removable memory device 10.

A program for tracking moving objects such as human beings or cars can be also stored in the removable memory device 10.

As explained above, the present invention can deal with objects with unknown initial positions or continually moving objects when tracking moving objects, and can recover the tracking procedures even when the tracking is failed during the tracking procedures.

What is claimed is:

1. An object movement tracking apparatus for detecting movements of an object from time-sequentially inputted images on real time basis comprising:
an observing device for observing a scene including said object and for acquiring inputted image data at a rate more than a predetermined rate;
an image memory device for temporally storing sequentially inputted image data from said observing device; and
a computer for processing said sequentially inputted image data so as to track the movement of said object, wherein:
said computer including memory for storing computer programs including:
an object recognition module for selecting a frame among image data stored in said image memory device frame by frame and detecting position/posture of said object in the selected frame; and
a movement tracking module for tracking the position/posture of said object in succeeding frames to the frame selected by said recognition module, wherein:
the movement tracking module and the object recognition module being arranged such that the movement tracking of said object is recovered by the operation of said object recognition module and said movement tracking module in parallel while the object recognition module and the movement tracking module communicate with each other when tracking movement of the object fails.

2. The object movement tracking apparatus according to claim 1 wherein said observing device comprises a single video camera equipped with an image sensor, said camera for providing said time-sequential images to said image memory device.

3. The object movement tracking apparatus according to claim 1 wherein said observing device comprises a stereo camera comprising a plurality of single cameras each equipped with image sensors, said camera for generating time-sequential stereo images which are inputted as said sequentially inputted image data into said image memory device.

4. The object movement tracking apparatus according to claim 1 wherein said observing device comprises a fast laser range finder for generating time-sequential distance images which are inputted from said finder into said image memory device as said sequentially inputted image data.

5. An object movement tracking method executed by an object movement tracking apparatus comprising:
an observing device for observing a scene including a object and for acquiring inputted image data at a rate more than a predetermined rate;
an image memory device for temporally storing sequentially inputted image data from said observing device; and
a computer for processing said sequentially inputted image data so as to track the movement of said object; wherein:
said computer includes memory for storing computer programs including:
an object recognition module for selecting a frame among image data stored in said image memory device frame by frame and detecting position/posture of said object in the selected frame; and
a movement tracking module for tracking the position/posture of said object in succeeding frames to the frame selected by said recognition module, wherein:
said computer employs the tracking method based on the image data sequentially inputted from said observing device and temporally stored in said image memory device, the tracking method comprising the steps of:
acquiring an initial position of said object to be tracked;
detecting a movement of said object;
tracking the movement of said object on real time basis based on the image data sequentially inputted and temporally stored in said image memory device; and
recovering and resuming said tracking the movement of said object by operating said object recognition module and movement tracking module in parallel as they communicate with each other when tracking the movement of said object fails during said tracking step, wherein:
said recovering and resuming step includes a substep to run said movement tracking module.

6. The object movement tracking method according to claim 5 wherein the object to be tracked is a rigid body with known shape and size and which rigid body object exhibits movements to be tracked relative to said observing device.

7. An object movement tracking apparatus comprising:
an observing device for observing a scene including said object and for acquiring inputted image data at a rate more than a predetermined rate;
an image memory device for temporally storing sequentially inputted image data from said observing device; and
a computer for processing said sequentially inputted image data so as to track the movement of said object; wherein:
said computer includes memory for storing computer programs including:
an object recognition module for selecting a frame among image data stored in said image memory device frame by frame and detecting position/posture of said object in the selected frame; and
a movement tracking module for tracking the position/posture of said object in succeeding frames to the frame selected by said recognition module, wherein:
said image memory device includes a recording medium which stores the following information and programs:
information on an initial position of said object to be tracked;
an object movement tracking program for detecting and tracking on real time basis based on image data inputted from said observing device and stored in said image memory device; and
a program for recovering and resuming tracking by operating said object recognition module and said movement tracking module in parallel while they communicate with each other when said tracking program fails in tracking the movement of said object during the tracking by said tracking program; wherein
said recovering and resuming program has a subprogram to run said movement tracking module.

8. The Apparatus according to claim 7, wherein:
said recording medium includes a program stored therein for tracking a rigid body object with known shape and size and which rigid body object with the known shape and size exhibits movements to be tracked relative to said observing device, and which movements are stored in said recording medium.

* * * * *